(12) United States Patent
Klein et al.

(10) Patent No.: US 11,997,636 B2
(45) Date of Patent: May 28, 2024

(54) METHOD AND APPARATUS FOR LINK OPERATION OF MULTI-LINK DEVICE (71) Applicant: HUAWEI TECHNOLOGIES CO., LTD., Shenzhen (CN)

(72) Inventors: Arik Klein, Hod Hasharon (IL); Shimon Shilo, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/324,732

(22) Filed: May 26, 2023

(65) Prior Publication Data

US 2023/0300773 A1    Sep. 21, 2023

Related U.S. Application Data

(63) Continuation of application No. PCT/EP2021/054374, filed on Feb. 23, 2021.

(51) Int. Cl.
*H04W 60/04* (2009.01)
*H04W 12/06* (2021.01)

(52) U.S. Cl.
CPC ........... *H04W 60/04* (2013.01); *H04W 12/06* (2013.01)

(58) Field of Classification Search
CPC ... H04W 60/04; H04W 12/06; H04W 88/085; H04W 74/0816; H04W 76/14; H04W 88/06; H04W 76/15; H04W 84/12; H04W 76/11
See application file for complete search history.

(56) References Cited

U.S. PATENT DOCUMENTS

| 11,510,269 | B2 * | 11/2022 | Asterjadhi | H04L 69/14 |
| 2014/0080501 | A1 * | 3/2014 | Lee | H04W 16/14 |
| | | | | 455/454 |
| 2018/0184428 | A1 | 6/2018 | Cariou et al. | |
| 2019/0335454 | A1 | 10/2019 | Huang et al. | |
| 2021/0212141 | A1 * | 7/2021 | Chu | H04W 48/12 |
| 2021/0289442 | A1 * | 9/2021 | Naribole | H04W 52/0222 |
| 2021/0352722 | A1 * | 11/2021 | Xin | H04L 1/1877 |

FOREIGN PATENT DOCUMENTS

WO    WO-2021011476 A1 *  1/2021  ............ H04W 48/12

OTHER PUBLICATIONS

Huang et al., "Proposed Draft Specification for ML General, MLD Authentication, MLD Association, and ML Setup," doc.: IEEE 802.11-20/1309r0, Total 34 pages (Aug. 2020).

(Continued)

*Primary Examiner* — Brandon J Miller
(74) *Attorney, Agent, or Firm* — Leydig, Voit & Mayer, Ltd.

(57) ABSTRACT

A multi-link device (MLD) has a medium access control (MAC) layer management entity (MLME) and a station management entity (SME). The SME indicates a selected link identity (ID) to the MLME. The selected link ID is used to indicate the link being used for frame exchange between an access point (AP) affiliated with an AP MLD and a non-AP station (STA) affiliated with a non-AP MLD. One or more frames are exchanged through the link indicated by the selected link ID.

14 Claims, 6 Drawing Sheets

(56) References Cited

OTHER PUBLICATIONS

"IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Std 802.11™-2016 (Revision of IEEE Std 802.11-2012), Total 3534 pages, Institute of Electrical and Electronics Engineers, New York, New York (Approved Dec. 7, 2016).

"Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT)," IEEE P802.11be™/D0.3, Total 196 pages, Institute of Electrical and Electronics Engineers, New York, New York (Jan. 2021).

"Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," IEEE P802.11ax™/D8.0 (amendment to IEEE P802.11REVmd/D5.0), Total 820 pages, Institute of Electrical and Electronics Engineers, New York, New York (Oct. 2020).

"Draft Standard for Information technology—Telecommunications and information exchange between systems Local and metropolitan area networks—Specific requirements, Part 11: Wireless LAN Medium Access Control (MAC) and Physical Layer (PHY) Specifications," IEEE P802.11-REVmd™/D5.0, Total 4668 pages, Institute of Electrical and Electronics Engineers, New York, New York (Sep. 2020).

"Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT)," IEEE P802.11be™/D0.1, Total 299 pages, Institute of Electrical and Electronics Engineers, New York, New York (Sep. 2020).

Gan et al., "ML element design," IEEE, doc.: IEEE 802.11-20/1124-03-00be, Internet URL: https://mentor.ieee.org/802.11/dcn/20/11-20-1124-03-00be-ml-element-design.pptx>, Total 14 pages (Aug. 2020; Uploaded on: Feb. 4, 2021).

Rison, "Review of P802.11be/D0.3 for CC34," IEEE, doc.: IEEE 802.11-21/0218r0, Internet URL: https://mentor.ieee.org/802.11/dcn/21/11-21-0218-00-00be-review-of-p802-11be-d0-3-for-cc34.docx>, Total 29 pages (Feb. 2021).

Fang et al., "Proposed draft 11be Spec text for MLME SAP—Authentication," IEEE, doc.: IEEE 802.11-20/1610r1, Internet URL: https://mentor.ieee.org/802.11/dcn/20/11-20-1610-01-00be-pdt-mac-mlo-6-3-5-and-6-authentication.docx>, Total 11 pages (Oct. 2020).

Fang et al., "Proposed draft 11be spec text for MLME SAP—Association," IEEE, doc.: IEEE 802.11-20/1611r1, Internet URL: https://mentor.ieee.org/802.11/dcn/20/11-20-1611-01-00be-pdt-mac-mlo-6-3-7-to-9-association.docx>, Total 17 pages (Oct. 2020).

* cited by examiner

METHOD AND APPARATUS FOR LINK OPERATION OF MULTI-LINK DEVICE

CROSS-REFERENCE TO RELATED APPLICATIONS

This application is a continuation of International Application No. PCT/EP2021/054374, filed on Feb. 23, 2021, the disclosure of which is hereby incorporated by reference in its entirety.

FIELD

The present disclosure relates to wireless communication systems and, more specifically, but not exclusively, to a system and method for link operation of multi-link device in a wireless fidelity, Wi-Fi, system.

BACKGROUND

Institute of Electrical and Electronics Engineers (IEEE), is in the study of next generation Wi-Fi standard for multi-link device (MLD). A wireless extremely high throughput (EHT) access point (AP) MLD and an associated EHT non-AP MLD may setup more than a single link and exchange frames on more than a single link, for example, on one link on 2.4 gigahertz (GHz) band and on another link on 5 GHz. These frame exchanges can be done concurrently on more than a single link or on a single link at a time.

For the new MLD feature, many technical problems need to be solved in order to make sure the MLD to be utilized successfully.

SUMMARY

Aspects of the present disclosure provide a method and apparatus for link operation of multi-link device (MLD), thereby improving the transmitting performance for the setup and/or tear-down procedure of MLD.

According to a first aspect of the present disclosure, a MLD is disclosed. The MLD may be an AP MLD or non-AP MLD. The MLD comprises a medium access control, MAC, Layer Management entity, MLME, and a station management entity, SME, comprising a processor and a transceiver, the processor is configured to: indicate, by the SME, a selected link identity, ID, to the MLME, wherein the selected link ID indicates the link being used for frame exchange between an access point, AP, affiliated with AP MLD and non-AP STA affiliated with non-AP MLD, and the transceiver is configured to: exchange one or more frames through the link indicated by the selected link ID.

In one possible implementation of the first aspect, the selected link ID is indicated in the following management services provided by the MLME to the SME: authenticate, deauthenticate, associate, reassociate, disassociate.

In one possible implementation of the first aspect, the MLD comprises a single MAC layer and at least two physical, PHY, layers.

In one possible implementation of the first aspect, the at least two PHY layers correspond to a separate frequency band, and each PHY layer is managed by a physical layer management entity, PLME.

In one possible implementation of the first aspect, the SME is configured to interact with the MLME and/or the PLME.

In one possible implementation of the first aspect, the selected link ID is comprised in a common part of a basic variant multi-link element, MLE.

In one possible implementation of the first aspect, the selected link ID is 4 bits.

According to a second aspect of the present disclosure, a method of MLD is disclosed. The MLD may be an AP MLD or non-AP MLD. The method is used in a wireless fidelity, Wi-Fi, system, and the MLD comprises a medium access control, MAC, Layer Management entity, MLME, and a station management entity, SME, comprising: indicating, by the SME, a selected link identity, ID, to the MLME, wherein the selected link ID is used to indicate the link being used for frame exchange between an access point, AP, affiliated with AP MLD and non-AP STA affiliated with non-AP MLD, and exchanging one or more frames through the link indicated by the selected link ID.

In one possible implementation of the second aspect, the selected link ID is indicated in the following management services provided by the MLME to the SME: authenticate, deauthenticate, associate, reassociate, disassociate.

In one possible implementation of the second aspect, the MLD comprises a single MAC layer and at least two physical, PHY, layers.

In one possible implementation of the second aspect, the at least two PHY layers correspond to a separate frequency band, and each PHY layer is managed by a physical layer management entity, PLME.

In one possible implementation of the second aspect, the SME interacts with the MLME and/or the PLME.

In one possible implementation of the second aspect, the selected link ID is comprised in a common part of a basic variant multi-link element, MLE.

In one possible implementation of the second aspect, the selected link ID is 4 bits.

According to a third aspect of the present disclosure, a computer readable storage medium is provided. The computer readable storage medium stores an instruction, and when the instruction runs on a computer, the computer is enabled to perform the method of link operation for MLD according to any one of the second aspect or the possible implementations of the second aspect.

According to a fourth aspect of the present disclosure, a computer program product including an instruction is provided. When the computer program product runs on a computer, the computer is enabled to perform the method of link operation for MLD according to any one of the second aspect or the possible implementations of the second aspect.

According to a fifth aspect of the present disclosure, a communications system is provided. The communications system includes a plurality of MLDs, and the plurality of MLDs include AP MLD and non-AP MLD, where the MLD is configured to support the method of link operation for MLD according to any one of the second aspect or the possible implementations of the second aspect.

According to a sixth aspect of the present disclosure, computer storage medium, or computer program product of any one of the methods of link operation for MLD is configured to perform the corresponding method provided above, and therefore, for beneficial effects that the apparatus, the computer storage medium, or the computer program product can achieve, reference may be made to beneficial effects of the corresponding method provided above.

Other apparatus, methods, features, and advantages of the present disclosure will be or become apparent to one with skill in the art upon examination of the following drawings and detailed description. It is intended that all such additional apparatus, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

DETAILED DESCRIPTION

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Figure 1:
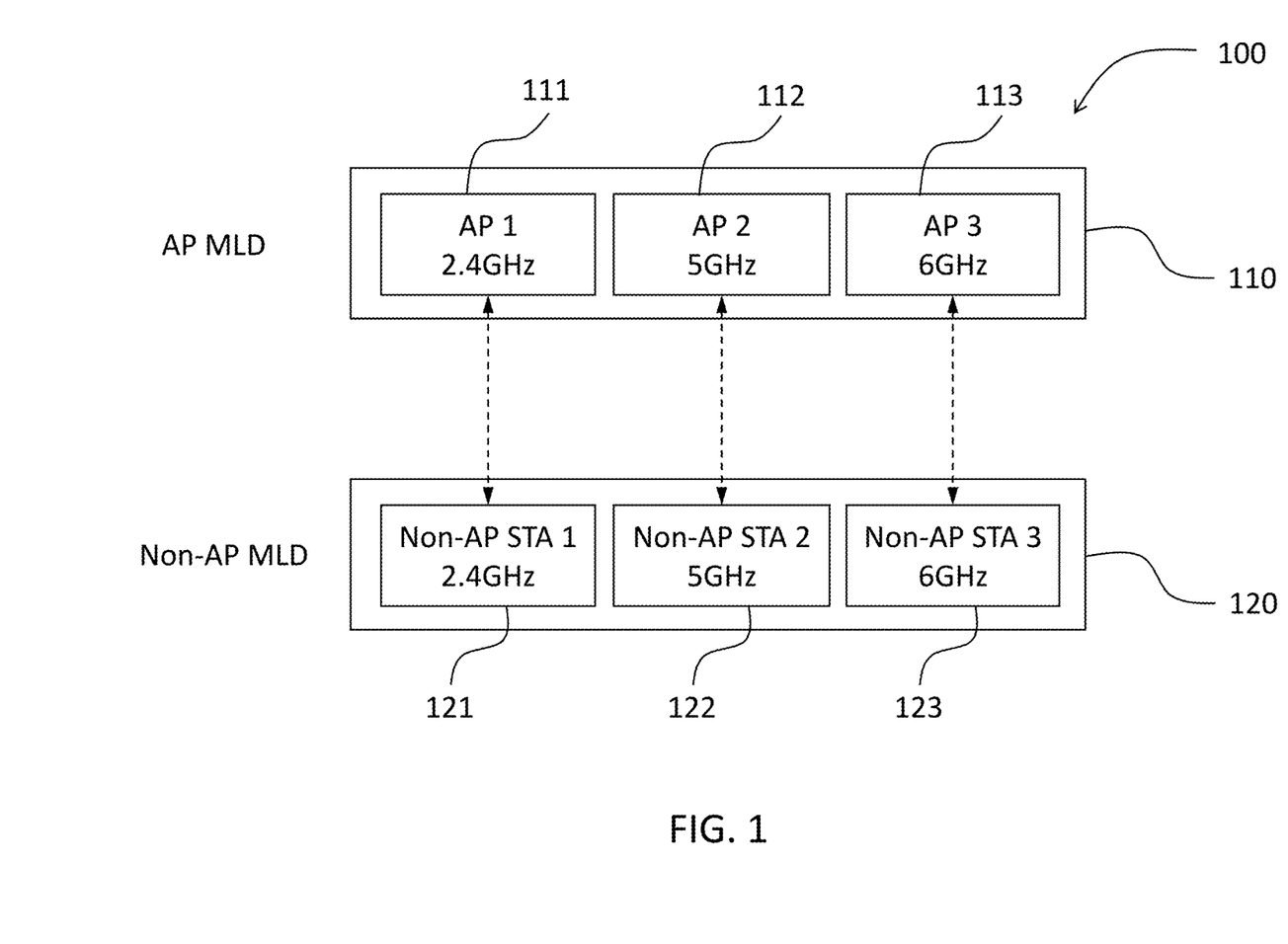
FIG. 1 shows a system for link operation for MLD according to some embodiments of the present disclosure.

FIG. 1 shows a system for multi-link operation for MLD according to some embodiments of the present disclosure. System 100, includes an AP MLD 110 and one or more non-AP stations (STAs) 120. The AP MLD 110 includes a plurality of APs, for example 111 (AP 1) operated on 2.4 GHz link, 112 (AP 2) operated on 5 GHz link and 113 (AP 3) operated on 6 GHz link in FIG. 1. The non-AP MLD 120 includes a plurality of non-AP stations (non-AP STA), for example, 121 (non-AP STA 1) operated on 2.4 GHz link, 122 (non-AP STA 2) operated on 5 GHz link and 123 (non-AP STA 3) operated on 6 GHz link in FIG. 1. In some embodiments, the MLD may refer to AP MLD, while the MLD may refer to non-AP STA in some other embodiments. In system 100, The AP affiliated with the AP MLD may use the corresponding link to communicate with the non-AP STA affiliated with the non-AP MLD.

The system 100 in the present disclosure includes but is not limited to: a 802.11be system or beyond.

In the present disclosure, the MLD may be AP MLD or non-AP STA. The non-AP MLD may be for example, a mobile phone, an intelligent terminal, a tablet computer (tablet), a notebook computer (laptop), a video game console, a multimedia player, vehicle which supports Wi-Fi, device to device (D2D) equipment, or any smart devices. The AP MLD and/or non-AP MLD may be stationary or mobile devices.

For ease of description, meanings of terms used in this application are defined as follows:

Multi-link device (MLD): A device that is a logical entity and has more than one affiliated AP/non-AP STA and has a single medium access control (MAC) service access point (SAP) to logical link control (LLC), which includes one MAC data service.

Access point (AP) multi-link device (MLD): An MLD, where each station (STA) affiliated with the MLD is an AP. A non-access point (non-AP) multi-link device (MLD): An MLD, where each station (STA) affiliated with the MLD is a non-AP STA.

Each of the affiliated APs or non-AP STA has its own MAC address for a frame exchange performed on a link it is operating. However, the AP or non-AP MLD has its own MAC address in order to reflect a single entity towards the upper layers through which all the outgoing and incoming MAC service data units (MSDUs) are transferred, so that the multi-link operation is entirely defined within the MAC layer.

Parameters of the AP or non-AP MLD are either categorized as link level parameters and/or as MLD level parameters. The link level parameters may have different values for each affiliated AP or non-AP STA as per link, whereas the MLD level parameters have a single value that is used by all affiliated APs or non-AP STAs on all links.

The MLD may use setup as the process through which the non-AP MLD becomes associated with the AP MLD. All the MSDUs that are originated by an entity connected with the network may be delivered to the non-AP MLD. And the MSDUs may be directed to any of the AP MLDs with which the non-AP MLD has performed the setup procedure. Once the MSDUs are delivered to the AP MLD, they may be directed to one or more of the APs affiliated with the AP MLD, which will initiate the transmission of the MSDUs through one or more setup links that are enabled for transmission towards the non-AP MLD through a wireless medium (WM).

Similarly, the MLD may use a MLD tear-down process through which the non-AP MLD becomes unassociated with the AP MLD. The MSDUs generated by an entity that is connected with the network should be delivered to the non-AP MLD, may not be directed to the AP MLD from which the non-AP MLD has become unassociated with. When the non-AP MLD becomes unassociated with the AP MLD, there are no data frames which can be exchanged between the non-AP MLD and the AP MLD.

The setup process should be preceded with successful authentication procedure. The setup process may be done using at least one association request frame and at least one association response frame. The at least one association request frame and the at least one association response frame may include the multi-link element (MLE) which may include all the parameters of each affiliated AP or non-AP STA.

The procedures in current MLD standard are not clearly defined. It may lead to the AP MLD and/or non-AP MLD initiate a frame exchange on more than one link, which will lead to inefficient procedure and duplicate operation.

In order to solve the problem above, the present disclosure provides a method and/or apparatus link operation of MLD. The present disclosure provides a MLD comprising a processor, configured to: indicate, by the SME, a selected link identity, ID, to the MLME, wherein the selected link ID indicates the link being used for frame exchange between an access point, AP, affiliated with AP MLD and non-AP STA affiliated with non-AP MLD, and, a transceiver, configured to: exchange one or more frames through the link indicated by the selected link ID.

The selected link ID is indicated in the following management services provided by the MLME to the SME: authenticate, deauthenticate, associate, reassociate, disassociate. The MLD comprises a single MAC layer and at least two physical, PHY, layers. The at least two PHY layers correspond to a separate frequency band, and each PHY layer is managed by a physical layer management entity, PLME.

It should be noted that, the method and/or apparatus provided in the present disclosure may not restrict it being used for any MLDs which have the same problem.

Embodiments present in the current disclosure may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to: an electronic storage device, a magnetic storage device, an optical storage device, an electromagnetic storage device, a semiconductor storage device, or any suitable combination of the foregoing.

A non-exhaustive list of more specific examples of the computer readable storage medium includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. A network adapter card or network interface in each computing/processing device may receive computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Figure 5:
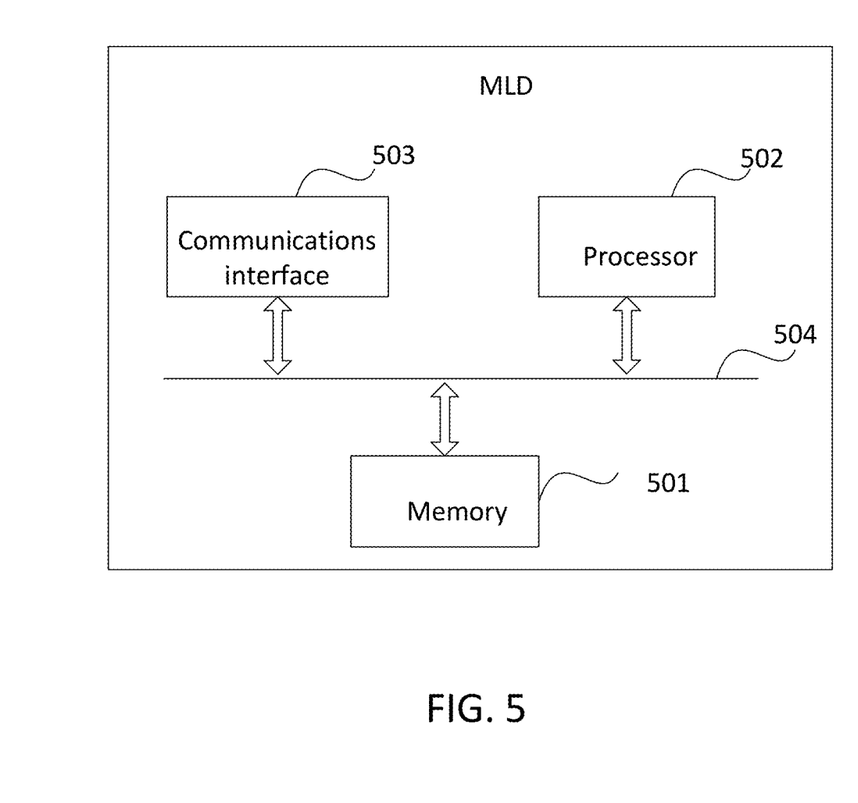
FIG. 5 shows a schematic diagram of a possible logical structure of a MLD in the present disclosure according to some embodiments.

FIG. 5 shows a schematic diagram of a possible logical structure of a MLD in the present disclosure according to some embodiments. The MLD includes a processor 502. In some embodiments of the present disclosure, the processor 502 may be configured to control and manage one or more actions of the MLD, e.g. configured to execute a code for indicating by the SME a selected link ID to the MLME. Optionally, the MLD may further include a memory 501 and a communications interface 503. The processor 502, the communications interface 503, and the memory 501 may be connected to each other or may be connected to each other by using a bus 504. The communications interface 503 is configured to support the MLD in performing communication, and the memory 501 is configured to store program code and data of the communication device. The processor 502 calls the code stored in the memory 501 to perform control and management. The memory 501 may or may not be coupled to the processor 502.

The processor 502 may be a central processing unit, a general-purpose processor, a digital signal processor, an application-specific integrated circuit, a field programmable gate array or another programmable logical device, a transistor logical device, a hardware component, or any combination thereof. The processor 502 may implement or execute various example logical blocks, modules, and circuits described with reference to content disclosed in the present disclosure. Alternatively, the processor 502 may be a combination of processors implementing a computing function, for example, a combination of one or more microprocessors, or a combination of the digital signal processor and a microprocessor. The bus 504 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like.

The communications interface 503 may be a transceiver which can support transmitting and/or receiving radio signal, or the communications interface 503 may be a soft interface for communication between different modules which may be an internal and/or external module.

Figure 2:
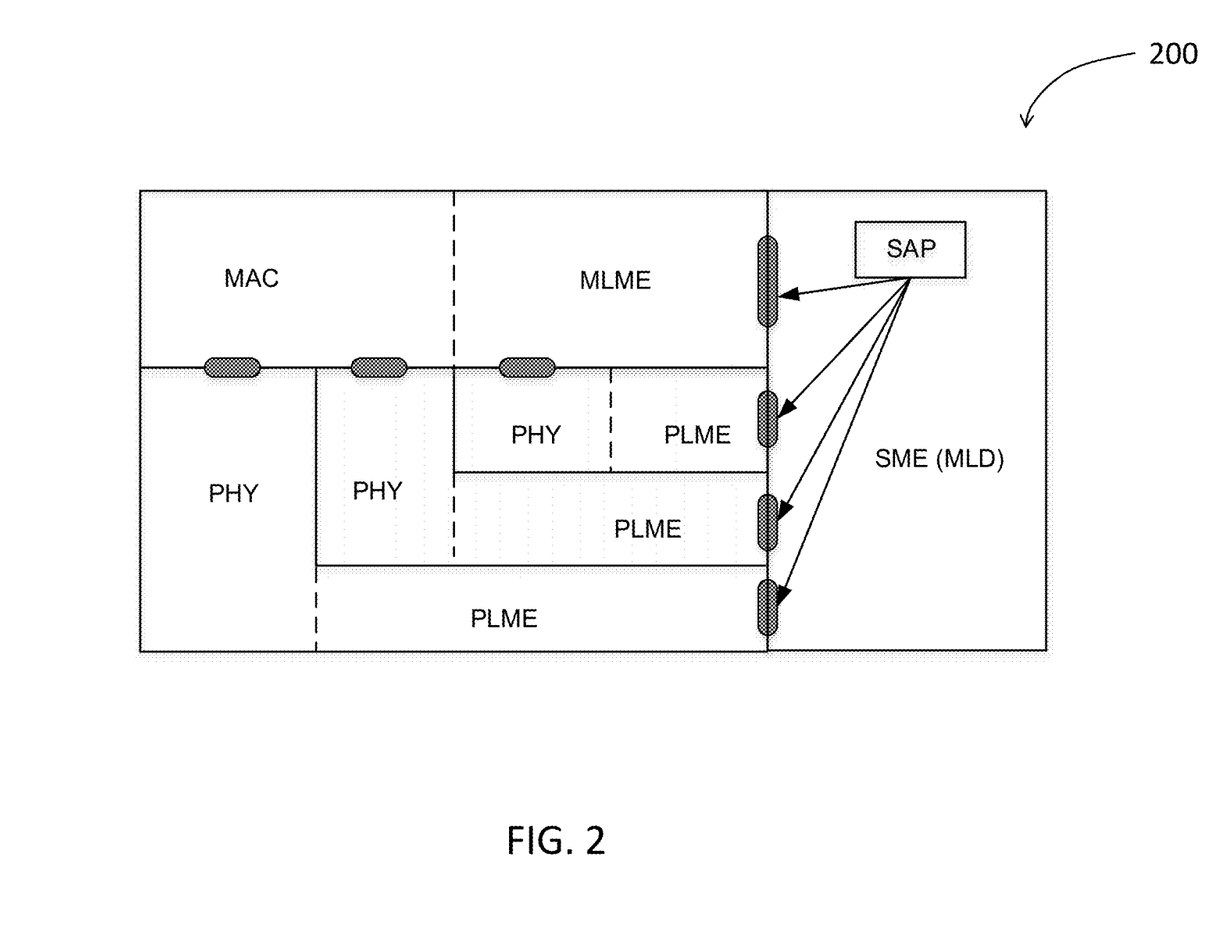
FIG. 2 shows a proposed management entity architecture for the MLD.

FIG. 2 shows a proposed management entity architecture for the MLD. The management entity architecture 200 includes a station management entity (SME), a MAC layer management entity (MLME) and at least two physical (PHY) layer management entity (PLME).

The SME is an overall management entity of MLD, including AP MLD and non-AP MLD. The SME is responsible to provide correct MAC layer operation. The SME may perform management function of higher layers and implement standard management protocols. Generally, the SME may be not necessarily considered as an integral part of the MLD, whereas the MLME and the PLME may be considered as an internal part of the STA.

The SME may use layer dependent management entities, e.g. MLME and/or PLME, to carry out specific actions or services that are required for the STA operation. The interaction between the management entities may be done through service access point (SAP). The management services through the SAP include: authenticate, associate, reassociate, disassociate, etc. In a MLD, the SME may be responsible for all management activities done in the MLD.

The services that are provided by the MLME to the SME that may be used during the MLD setup procedure induced at least: authenticate, associate, reassociate, disassociate.

Figure 3:
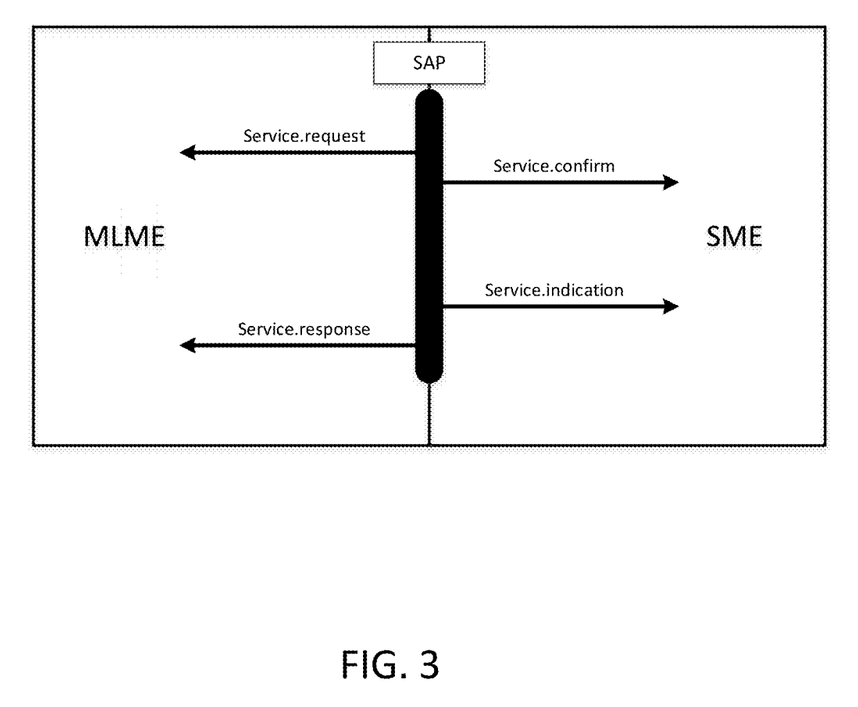
FIG. 3 shows an example of primitives defined for each MLME service.

The SME may interact with the MLME and/or the PLME by the service provided through the SAP. A kind of abstract primitives are defined in order to provide service between different layers or sublayers. FIG. 3 shows an example of primitives defined for each MLME service.

As shown in FIG. 3, the primitives include:
Service.request
Service.confirm
Service.indication
Service.response The primitives Service.request and Service.response may be generated by the SME, while the primitives Service.confirm and Service.indication may be generated by the MLME. Each of the primitives may be abstractly defined as a function with set of parameters that are assigned by the generator, e.g. SME and/or MLME, of the primitive. The service in the primitive may for example be one of authenticate, associate, reassociate, disassociate.

In order to solve the problem above, the SME may indicate a selected link ID to the MLME, wherein the selected link ID indicates the link being used for frame exchange between an access point, AP, MLD and non-AP MLD.

By indicating the selected link ID, the MLME may know the link to be used for the frame exchange. The advantage is that it avoids transmitting the management functions on each link and the efficiency is therefore improved.

It should be noted that the selected link ID may have different names in different primitive. For example, the selected link ID may be referred as selectedSetupLinkID in a MLME-ASSOCIATE.request, a MLME-REASSOCIATE.request, a MLME-ASSOCIATE.response, or a MLME-REASSOCIATE.response primitive; the selected link ID may be referred as selectedTeardownLinkID in a MLME-DISASSOCIATE.request; the selected link ID may be referred as selectedAuthenticateLinkID in a MLME-AUTHENTICATE.request, or a MLME-DEAUTHENTICATE.request primitive.

In one embodiment, a selectedSetupLinkID may be indicated in a MLME-ASSOCIATE.request, a MLME-REASSOCIATE.request, a MLME-ASSOCIATE.response, or a MLME-REASSOCIATE.response primitive. The selectedSetupLinkID may indicate the Link ID value through which the association or reassociation request/response frame exchange may be done during the MLD setup phase. The value may be one of the Link ID values defined in the AP MLD MLE.

The following parameters may further be indicated in the MLME-ASSOCIATE.request or MLME-REASSOCIATE.request primitive:
PeerSTAAddress: which refers to the AP MLD MAC address with which the non-AP MLD may become associated;
EHT capabilities: a set of capabilities that may be defined for MLD, e.g. AP MLD or non-AP MLD;
Basic variant MLE: which includes the information of each affiliated STA of the non-AP MLD (including the non-AP MLD MAC Address).

Upon receipt of an MLME-ASSOCIATE.request primitive, the non-AP MLD may initiate the transmission of an association request frame with basic variant MLE in the association request frame using one of non-AP STA affiliated with the non-AP MLD that is operating on the Link ID indicated in the MLME-ASSOCIATE.request primitive.

This way, the MLME "translates" each service required by the SME into a specific set of management frames that shall be exchanged between the non-AP STA affiliated with the non-AP MLD and the AP affiliated with the AP MLD.

In one embodiment, a selectedAuthenticateLinkID may be indicated in a MLME-AUTHENTICATE.request, or a MLME-DEAUTHENTICATE.request primitive. The selectedAuthenticateLinkID may indicate the Link ID value through which the authentication or deauthentication frame exchange may be done during the MLD pre-setup phase. The value may be one of the Link ID values defined in the AP MLD MLE.

The following parameters may further be indicated in the MLME-AUTHENTICATE.request primitive:
PeerSTAAddress: which may refer to the AP MLD MAC address with which the non-AP MLD shall authenticate;
Basic variant MLE: which includes the information of each affiliated STA of the non-AP MLD (including the non-AP MLD MAC Address).

In one embodiment, a selectedTeardownLinkID may be indicated in a MLME-DISASSOCIATE.request primitive. The selectedTeardownLinkID may indicate the Link ID value through which the corresponding disassociation frame exchange may be done during the MLD tear-down phase. The value may be one of the Link ID values that have been setup between the AP MLD and the non-AP MLD and are available for transmission.

In one embodiment, the MLD setup procedure may be done using the following guidelines:
The setup process may be preceded with successful authentication procedure.
The setup process may be done using the association request frames and association response frames. The association request frames and association response frames include a MLE. The MLE may include all the parameters of each affiliated AP and/or non-AP STA.
The association request frames and association response frames may be exchanged through a single link, e.g. the selected link between one affiliated non-AP STA and one affiliated AP operating on the same link.
Each non-AP STA affiliated with the non-AP MLD will be associated with the AP affiliated with the AP MLD that operates on the same link.
The association response frames may include the decision of each affiliated AP whether to accept or reject the association request that was sent by the affiliated non-AP STA operating on the same link.

Only the links that were accepted by the corresponding affiliated AP or non-AP, may be defined as setup links. The non-AP MLD may become associated with the AP MLD through a plurality of setup links.

Due to the selected link is used for the association request frame and association response frame, transmitting on each link the association request frames and association response frames is avoided and efficiency is improved.

Figure 4:
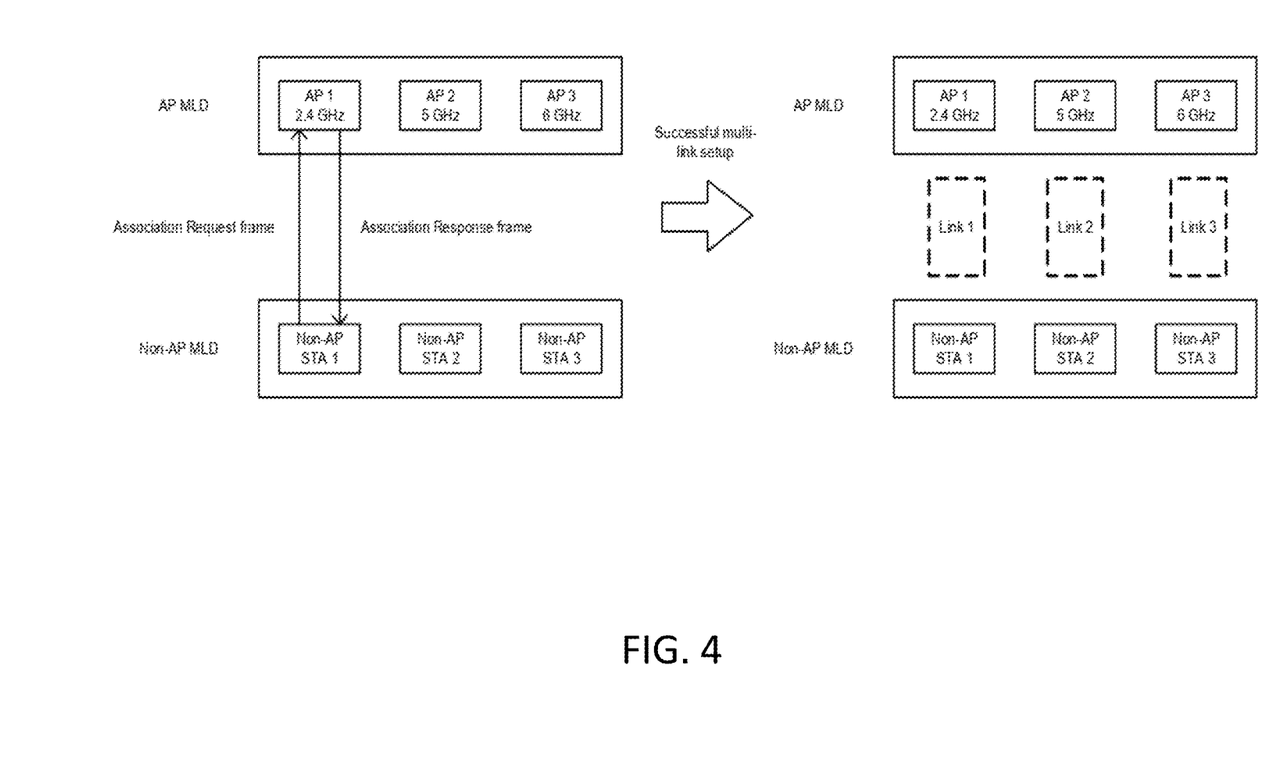
FIG. 4 shows an example of MLD setup procedure of a non-AP MLD and an AP MLD.

FIG. 4 shows an example of MLD setup procedure of a non-AP MLD and an AP MLD. In FIG. 4, the AP MLD includes 3 affiliated APs: AP 1 operating on 2.4 GHz frequency band, AP 2 operating on 5 GHz frequency band, and AP3 operating on 6 GHz frequency band. The non-AP MLD includes 3 affiliated non-AP STAs: STA 1 operating on 2.4 GHz frequency band, STA 2 operating on 5 GHz frequency band, and STA 3 operating on 6 GHz frequency band.

The MLD setup may be done through the link on 2.4 GHz frequency band and may include the transmission of association request frame and the reception of association response frames. Each of these frames include a MLE.

The MLE included in the association request frame may contain all the parameters of each of the affiliated non-AP STAs that requires the association with the corresponding affiliated APs.

The MLE included in association response frame may contain all the parameters of each of the affiliated APs as well as the indication whether the association is accepted or rejected.

When a successful multi-link setup process, and all the request for all the links have been accepted, the non-AP STA 1 is associated to the AP 1, the non-AP STA 2 is associated to the AP 2, and the non-AP STA 3 is associated to the AP 3.

In one embodiment, the MLD tear-down procedure may be done using the following guidelines:

The setup process may be done using the disassociation frame that can be initiated by either the AP MLD or the non-AP MLD.

The disassociation frame shall be exchanged through a single link, e.g. a selected link between one affiliated non-AP STA and one affiliated AP operating on the same link.

Consequently, the recipient of the disassociation frame will prohibit each of the affiliated non-AP STAs/APs from sending any MSDU to the corresponding affiliated AP/non-AP STA.

This way, the non-AP MLD and the AP MLD may become unassociated for all the links.

Due to the selected link is used for the disassociation frame exchange, transmitting the disassociation frame on each link is avoided and efficiency is improved.

In one embodiment, security related keys for example pairwise master Key (PMK) and pairwise transient key (PTK) may be defined in the MLD level. Therefore, the PMK, PTK which are used for data frames encryption/decryption may be used by all the non-AP STAs affiliated with the non-AP MLD and by all the APs affiliated with the AP MLD for the frame exchanges between the non-AP MLD and the AP MLD.

Moreover, the authentication procedure may generate the PMK for example under a simultaneous authentication of equals (SAE) method. The PTK may be generated in the 4-way handshake procedure that occur after the MLD setup procedure. The generation of the PMK may be done through authentication frame exchange on a selected link, and the PMK generated by one non-AP STA affiliated with non-AP MLD and the corresponding AP affiliated with AP MLD shall be used by all other non-AP STAs/APs affiliated with the same MLD.

By using the selected link for the authentication frame exchange, transmitting on each link of the authentication frame is avoided and efficiency is improved.

In one embodiment, the MLD may exchange one or more frames through the link indicated by the selected link ID. The selected link ID may be anyone of selectedSetupLinkID, selectedAuthenticateLinkID or selectedTeardownLinkID elaborated above. It should be noted that the names of selectedSetupLinkID, selectedAuthenticateLinkID or selectedTeardownLinkID are not restriction in the present disclosure.

Selected link ID may be included in a common Information part of basic variant MLE. The selected link ID indicates the link ID value through which the corresponding frame exchange may be performed when the MLE is included in such a frame (for specific set of frames).

The one or more frames used in the MLD setup and/or tear-down procedure include but not limited to: authentication, deauthentication, association request, association response, reassociation request, reassociation response, disassociation.

Optionally, the selected link ID is 4 bits.

Figure 6:
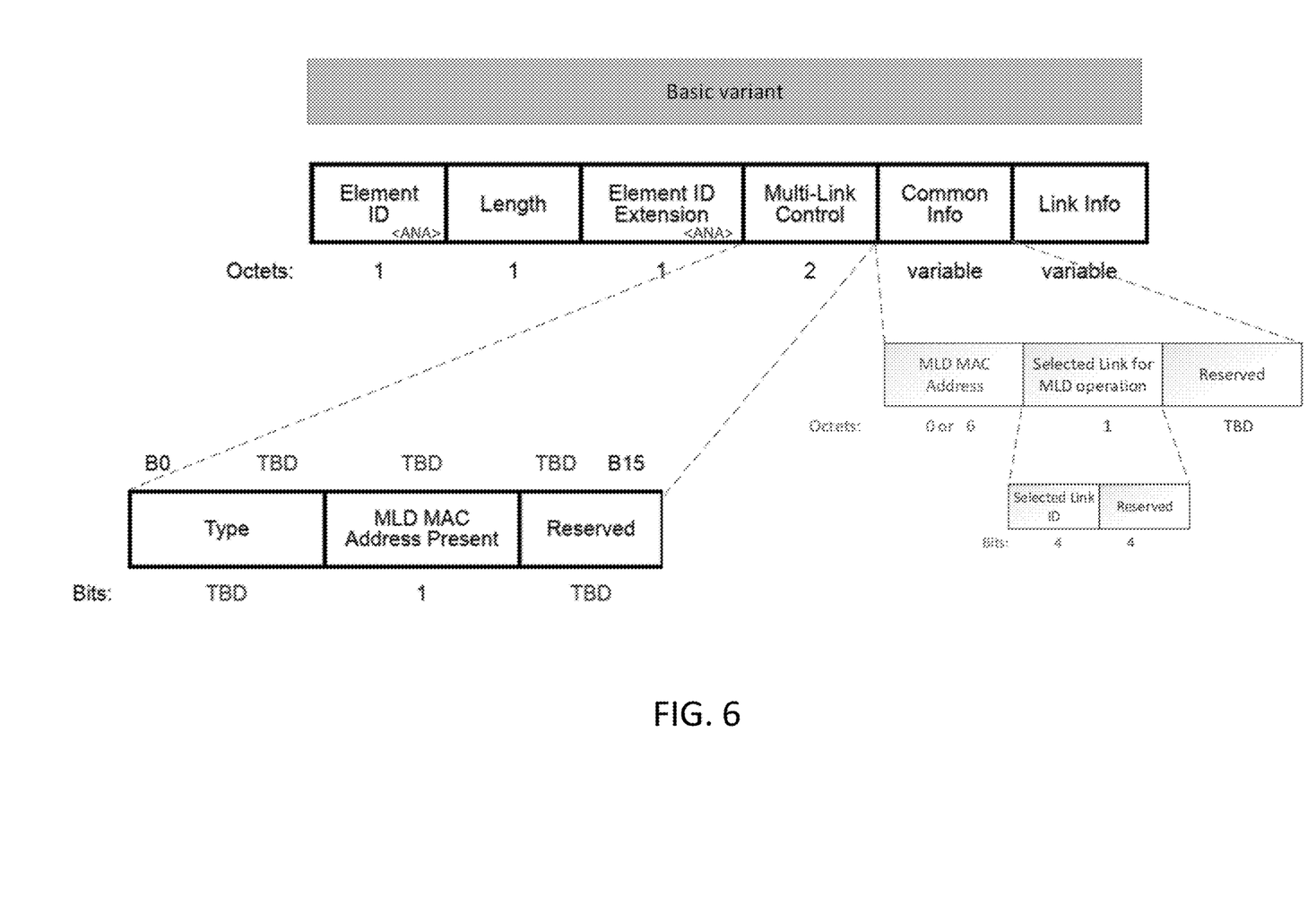
FIG. 6 shows an example MLE structure which includes selected link ID.

FIG. 6 shows an example frame structure which includes selected link ID. In FIG. 6, the selected link ID is included in a "Selected Link for MLD operation" field within a common information part of a basic variant MLE. The TBD in FIG. 6 is an abbreviation of "to be defined", and it means it is not defined yet in a prior art. The selected link ID is a new added field in the frame. The selected link ID may be set to 4 bits, but how many bits are set may depend on standard definition and this disclosure have no restrict of the length of the selected link ID, for example, the selected link ID may be set 8 bits, 16 bits or k bits, wherein k is an integer.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terms "comprises", "comprising", "includes", "including", "having" and their conjugates mean "including but not limited to".

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The symbol "A/B" may include A and B, A or B.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable sub-combination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Although the present disclosure describes the solution for link operation of MLD from apparatus point of view, it is obvious for a skilled person to understand that the problems to be addressed in the present disclosure can also be implemented by a method and/or system. The method for link operation of MLD will not be elaborated in order to avoid redundancy.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to embodiments. To the extent that section headings are used, they should not be construed as necessarily limiting.

What is claimed is:

1. A method of link operation for a multi-link device (MLD), the method being used in a wireless fidelity (Wi-Fi) system, and the MLD comprising a medium access control (MAC) layer management entity (MLME) and a station management entity (SME), the method comprising:
    indicating, by the SME, a selected link identity (ID) to the MLME, the selected link ID being used to indicate the link being used for frame exchange between an access point (AP) affiliated with an AP MLD and a non-AP station (STA) affiliated with a non-AP MLD, wherein the selected link ID is indicated in the following management services provided by the MLME to the SME: authenticate, deauthenticate, associate, reassociate, and disassociate; and
    exchanging one or more frames through the link indicated by the selected link ID.

2. The method of claim 1, wherein the MLD comprises a single MAC layer and at least two physical (PHY) layers.

3. The method of claim 2, wherein the at least two PHY layers correspond to separate frequency bands, and each of the PHY layers is managed by a physical layer management entity (PLME).

4. The method of claim 3, wherein the SME interacts with the MLME or the PLME.

5. The method of claim 1, wherein the selected link ID is comprised in a common part of a basic variant multi-link element (MLE).

6. The method of claim 1, wherein the selected link ID is 4 bits.

7. A non-transitory machine-readable storage medium having stored thereon processor-executable instructions, which when executed by a processor of a communication device, cause the communication device to implement the method according to claim 1.

8. A multi-link device (MLD) configured to be operated in a wireless fidelity (Wi-Fi) system, the MLD comprising a medium access control (MAC) layer management entity (MLME) and a station management entity (SME), comprising a processor, configured to:
    indicate, by the SME, a selected link identity (ID) to the MLME, the selected link ID indicating the link being used for frame exchange between an access point (AP) affiliated with an AP MLD and a non-AP station (STA) affiliated with a non-AP MLD,
    wherein the selected link ID is indicated in the following management services provided by the MLME to the SME: authenticate, deauthenticate, associate, reassociate, and disassociate, and
    wherein the MLD further comprises a transceiver, configured to:
        exchange one or more frames through the link indicated by the selected link ID.

9. The MLD of claim 8, wherein the MLD comprises a single MAC layer and at least two physical (PHY) layers.

10. The MLD of claim 9, wherein the at least two PHY layers correspond to separate frequency bands, and each of the PHY layers is managed by a physical layer management entity (PLME).

11. The MLD of claim 10, wherein the SME is configured to interact with the MLME or the PLME.

12. The MLD of claim 8, wherein the selected link ID is comprised in a common part of a basic variant multi-link element (MLE).

13. The MLD of claim 8, wherein the selected link ID is 4 bits.

14. A computer program product comprising a non-transitory computer-readable storage medium having computer-readable instructions stored thereon, the computer-readable instructions being executable by a computerized device comprising processing hardware to execute the method of claim 8.

* * * * *